United States Patent Office 3,022,321
Patented Feb. 20, 1962

3,022,321
PREPARATION OF ADDUCTS OF MALEIC ANHYDRIDE AND DIENES DERIVED FROM THE ADDITION OF FORMALS, ACETALS AND ACYLALS TO OLEFINS
John W. Copenhaver, St. Paul, Minn., assignor to General Aniline & Film Corporation, New York, N.Y., a corporation of Delaware
No Drawing. Filed Dec. 12, 1957, Ser. No. 702,239
3 Claims. (Cl. 260—346.6)

The invention here presented relates to the synthesis of a new type of compound which may be described as a Diels-Alder adduct of a maleic anhydride type of substance with a diene formed in situ by dealkanolation, in the presence of a maleic anhydride type of substance, such as a dealcoholation of a 1,3-dialkoxyalkyl-containing compound previously prepared by reaction of olefins with acetals, ketals, acylals and the like, which diene reacts as formed with the maleic anhydride type product present during the dealkanolization reaction.

There are many chemical reactions which would yield valuable and important substances such as plasticizers, dyestuffs, pharmaceuticals, synthetic resins and the like, for which intermediates could be made, in the form of a 4-cyclohexene-1,2-dicarboxylic acid derivative, that is, a six carbon atom ring, alicyclic compound having one unit of unsaturation (cyclohexene) and a dicarboxylic acid portion derived from a maleic anhydride type of substance, with, if desired, other substituents on the hydroaromatic ring; but to the present such intermediates have not been synthesized due to difficulties in chemical syntheses and because of the lack of proper stable precursors.

Great difficulty has been found in the preparation of desired dienes containing appropriate substituents to condense with the maleic anhydride substance because of the very great tendency of the olefins in general to polymerize under a wide range of conditions, so that the desired reactions do not occur; instead, a condensation reaction takes place yielding a dimer or a polymer rather than the desired maleic anhydride type adduct.

According to the present invention, it is now found that a maleic anhydride type of substance (that is, a dienophile) has the unexpected and very valuable property of preventing an undesired condensation reaction between at least two diene molecules; and, instead, inducing an alternative Diels-Alder condensation reaction involving the maleic anhydride molecule and the diene, whereby there is formed a 6-membered carbon ring compound having one unit of unsaturation, and bearing a dicarboxylic acid residue from the maleic anhydride type of substance.

Hence, by the simultaneous use of a dealkanolation catalyst acting simultaneously with a maleic anhydride type substance, it becomes possible to convert an alkoxyalkene into a diene by a dealkanolation reaction, which diene instead of polymerizing, combines with the maleic anhydride type dienophile to yield the desired compound, which in turn is then capable of a wide range of other reactions, including hydrolysis of the anhydride residue into a dicarboxylic acid, or esterification to form the corresponding esters. In addition, since the original olefin may contain a wide range of substituents, which in general can be carried through the reaction unchanged, a great many alternative substituents can be obtained in the resulting compound. The reaction proceeds smoothly and produces the desired compound in high yield.

Thus the process of the invention utilizes the steps in combination of substantially simultaneously dealkanolating the condensation product of a terminally unsaturated polyalkene and a member of the group consisting of acetals, ketals and acylals to yield a diene with conjugated unsaturations, and reacting the said diene with a dienophile of the type A—CH=CH—A where A is a member of the class consisting of carboxy, carbalkoxy, acyl, and wherein the two A groups taken together represent a carboxylic acid anhydride grouping; for use in dyestuffs, pharmaceuticals and the like.

The reaction appears to be a general one, as is well shown in the following equations in which it will be noted that an alkoxyalkene is first dealkoxylated by the use of an acid catalyst to form a conjugated diene. This diene then is prevented from polymerizing by the presence of an appropriate amount of maleic anhydride type dienophile which may have such substituents as are desired, which then reacts with the diene to yield the desired compounds according to the following general schematic representation of the reaction:

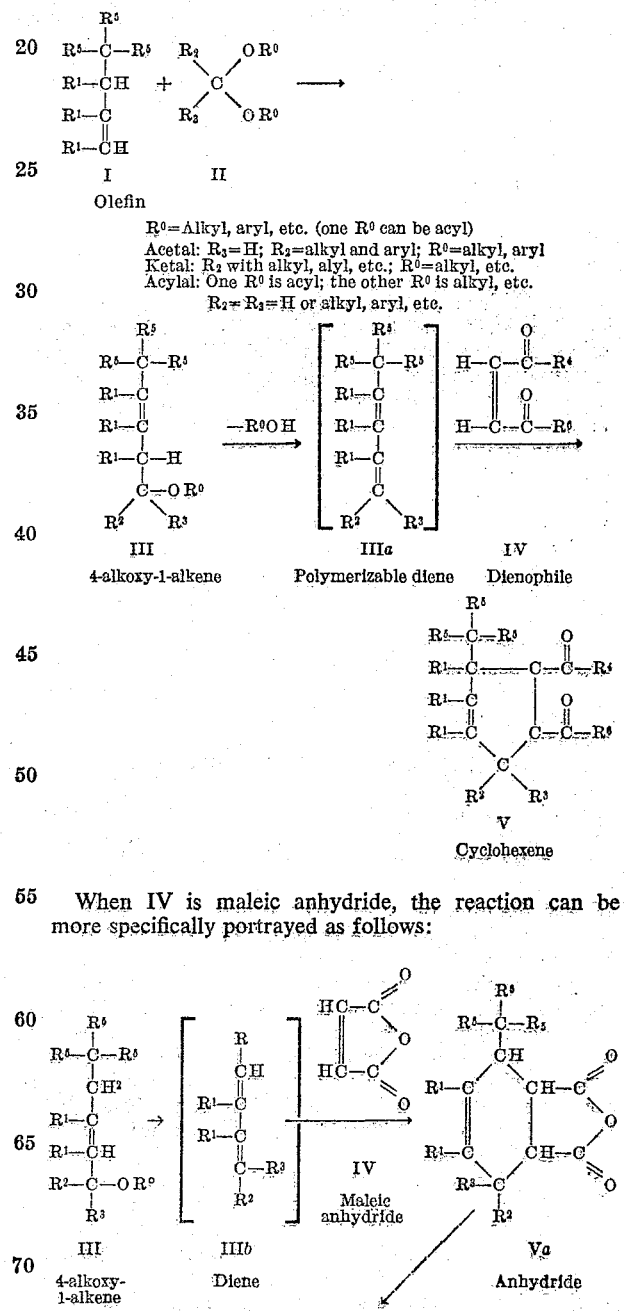

When IV is maleic anhydride, the reaction can be more specifically portrayed as follows:

V

Dicarboxylic acid

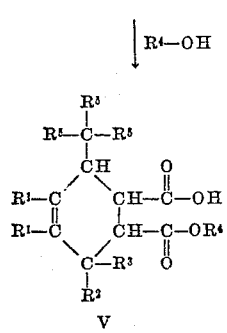

↓ R⁴—OH

V

Dicarboxylic acid or half ester

↓ R—OH

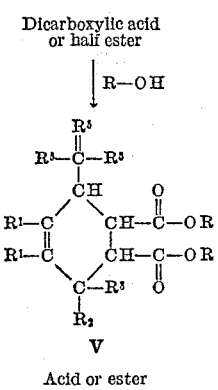

V

Acid or ester wherein R⁰ is alkyl; R¹ is a member of the group consisting of hydrogen and alkyl; R² is a member of the group consisting of alkyl, alkoxy-alkyl, alkenyl, aryl, aralkyl, aralkenyl, cycloalkyl, and heterocyclic radicals; R³ is a member of the group consisting of hydrogen, alkyl and aryl; R⁴ and R⁶ are members of the class consisting of hydroxy, alkoxy, aryloxy, alicyclic oxy, heterocyclic oxy, aralkoxy and where R⁴ and R⁶ together represent —O—; and R⁵ is a member of the group consisting of hydrogen and alkyl wherein at least 2 of the R⁵ groups are alkyl.

The intermediate III (alkoxyalkene) is prepared by reaction of I (a 1-alkene with at least two substituent groups on the 4-carbon) and II (an acetal, a ketal, or an acylal).

The present disclosure deals with the substantially simultaneous dealkanolization and diene adduct reactions, wherein III (alkoxyalkene; less likely to be the acyloxy-alkene) is dealkanolated to form diene III (diene with a pronounced tendency to polymerize) and immediately reacted with a dienophile IV to form a Diels-Alder adduct V; 3,6-substituted-4-cyclohexenedicarboxylic acid derivative (acid, anhydride or ester). The reaction is preferably carried out using maleic anhydride (IV, where R⁴ and R⁶ together represent a divalent oxygen atom, —O—). Ester adducts can be formed by (a) reaction of III and the ester of IV or (b) the maleic anhydride adduct (type Va) can be esterified. The free acid of V is formed by hydrolysis of Va (anhydride).

The reaction is conveniently conducted by heating stoichiometric amounts of the desired acetal, ketal, or acylal, containing such substituents as are desirable or useable; with maleic anhydride, or a maleic anhydride type of substance, containing substituents, if desired; in the presence of an acid catalyst such as p-toluene sulfonic acid or boron trifluoride etherate in ether solution and the highly potent catalyst in the form of aluminum chloride dissolved in methyl chloride and the like are similarly useful. As soon as reaction sets in (at a temperature about 100–120° C.), the external heat source is removed and the reaction allowed to proceed spontaneously. The reaction mixture is then heated to 160–170° C. for several hours to complete the reaction. The maleic-anhydride reaction product may be purified by dissolving it in alkali, followed by separation of any alkali insoluble material. The adduct is then precipitated with acid and may be purified by dissolving it in alkali followed by separation of any alkali insoluble material. The adduct is then reprecipitated with acid and may be further purified, if desired, by distillation. For the preparation of esters, the crude adduct anhydride can be used without further purification.

Thus the reaction of the present invention comprises heating a mixture of an acetal or the like with a maleic acid type substance, a 4-disubstituted-1-alkene, and an acid catalyst capable of producing a dealkanolation reaction whereby the acetal and the 4-disubstituted alkene react to form an alkoxyalkene, and the maleic anhydride type material substantially simultaneously reacts with the reaction product of the dealkanolated alkoxyalkene to yield an acid anhydride structure having a 6-membered carbon atom ring containing one unit of saturation, and any desired substituents derived from substituents in the acetal, 1-alkene or the dienophile; which reaction product may be converted to a dicarboxylic acid and esterified with any desired alcohol, or inorganic salts may be formed in the usual way.

Other objects and details of the invention will be apparent from the following description.

The primary raw materials for the present invention are 4-alkoxy-1-alkenes prepared by reaction of an appropriate olefin with a diether or ether-ester compound, that is, a carbon chain compound coupled through oxygen to another carbon compound, chemically known as acetals, ketals or acylals, and the like. The second component is a maleic anhydride type of substance which may be maleic anhydride itself, or may be a maleic anhydride type of substance in which one or more of the hydrogen atoms are replaced by a wide range of substituents which may be simple hydrocarbon substituents such as methyl, ethyl or propyl groups or of any desired larger number of carbon atoms, which in turn may carry any of the usual substituents such as a nitrogen-containing substituent, hydroxyl or carboxyl groups and the like. A preferred olefin for forming the 4-alkoxy-1-alkene component of this reaction is diisobutylene, but alternatively any of the 4-dialkylated-1-alkenes, in which the carbon at the three position bears at least one hydrogen and has five or more carbon atoms are operative; and as far as is now known, there is no upper limit in molecular weight. Minor amounts of 2-alkene impurities, such as the 2,4,4-trimethyl-2-pentene mixed with a major amount of 2,4,4-trimethyl-1-pentene such as found in commercial diisobutylene do not affect the course of the reaction with the latter (a 4-substituted alkene).

The second component of the invention then is the maleic anhydride type substance which may be maleic anhydride per se, or may be a substituted maleic anhydride substance. Maleic anhydride per se has, as is well known, the following structural formula:

and it is formed from maleic acid having the formula

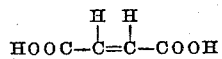

which upon removal of water forms the anhydride. However, there are other similar compounds which will react in the same way. Some of them will form an anhydride and react, some will react without the formation of the anhydride. Broadly the basic formula is:

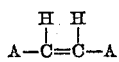

in which A may be selected from a wide range of compounds of which the following are representative:

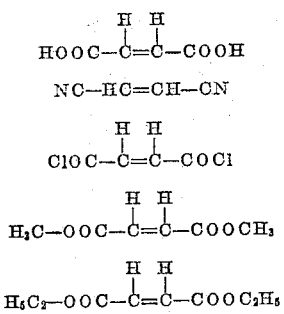

The reaction is broadly the "Diels-Alder" reaction. Accordingly, when the desired olefin acetal, acylal or ketal reaction product is available, the combined dealcoholization and condensation reactions may be conducted much as the standard Diels-Alder reaction is conducted. The respective components are mixed in equi-molecular proportions, preferably at room temperature. The reaction usually is exothermic, but it may in some instances be necessary to heat the mixture mildly to start the reaction. The raw materials may, in some instances, merely be mixed, preferably finely powdered, or if one material is liquid, the other may be dissolved or suspended in it. Alternatively, one or more of a wide range of inert solvents or diluents may be added. Such substances as benzene, xylene, nitrobenzene, ether and the like are excellent solvent-diluents for the reaction, they may in some instances dissolve one or both of the reactants, and in any event serve to moderate the reaction and to remove the heat of reaction; either by conduction of the heat to the walls of a containing vessel, or by volatilization and condensation in a reflux condenser. No catalysts or condensing agents other than the dealcoholization catalyst is necessarily required and the reaction in practically every case will go without any condensing agent. However, in some instances the reaction is slower than is desirable; in which case such catalysts as trichloroacetic acid or α-naphthoquinone and the like are useful. In other instances, the heat of reaction is so large that it must be dissipated by slowing the reaction to enhance safety in the process. For this purpose, the diene or diene precursors may be emulsified in water media; the water serving to restrict the contact between the reactants and to limit the speed of reaction. In other instances, an excess over molecular proportions of the dienophile may be desirable, especially when relatively high boiling solvents or diluents are used and refluxed. By the appropriate use of these variations in procedure, a nearly hundred percent yield of the adduct or reaction product may often be caused to separate in nearly pure form.

The reaction is moderately exothermic and accordingly when the reaction begins, the source of outside heat may be removed. The reaction will then go almost to completion, and it may be carried further by refluxing the mixture at an appropriate temperature for a substantial additional time. At the end of that time, the low-boiling components may be distilled off and the material recovered and purified as described.

The following examples are offered as presenting the best method now known of conducting the reaction, but they are not intended to limit the claims nor the scope of the disclosure in any way.

EXAMPLE 1

The preparation of the compound of the invention was as follows:

Intermediate 3 ml. BF$_3$-ether complex was added to 324 g. (3 moles) dimethoxymethane (N$_D^{25}$ 1.3814) cooled to 10–15° C. The solution was then cooled to 5° C., and 168 g. (1.5 moles) diisobutylene (2,4,4-trimethyl-1-pentene) was added dropwise at such a rate that the pot temperature was 3.5–5° C. (bath temperature, 0–3°). The addition required about 1¼ hours. The solution was kept at 0–5° for 5 hours, then was placed in the refrigerator overnight.

While the solution was kept at 5–10° C., 12.00 cc. of 10% NaOH was added dropwise with stirring. After the mixture was refluxed two hours, the organic layer was separated and fractionally distilled, yielding the following most desirable fractions.

| Fraction | Pot Temperature | Dist. Temperature | Pressure | Amount g. | N$_D^{25}$ | Comments |
|---|---|---|---|---|---|---|
| 7 | 150 | 105 | 8 | 22 | 1.4360 | Heart cut for analysis. |
| 8 | 150 155–195 | 105 83–87 | 8 3 | | 1.4421 | |

Product 85 g. (0.5 mole) of 2,2,4-trimethyl-6-methoxyheptene-3 (as aboved produced)
1 g. p-toluene sulfonic acid and
49 g. (0.5 mole) maleic anhydride were mixed and heated. A vigorous reaction set in at 120° C. and was controlled by cooling. The reaction mixture was then heated at 160–170° C. for 3½ hours, cooled and refluxed with 100 ml. of 10 percent sulfuric acid for 4 hours. The thick syrupy material was separated from the aqueous layer, dissolved in 10 percent sodium hydroxide solution, and the alkaline solution extracted with ether to remove any insoluble material. The aqueous layer was then acidified with conc. hydrochloric acid, and the insoluble layer separated with ether. The product was then isolated by distillation and found to boil at 136–148° C. at 3–4 mm. and had N$_D^{25}$ 1.4840–1.4844. It was characterized as the 1:1 adduct of maleic anhydride and the expected diene by analysis and molecular weight determination.

*Analysis.*—Calc. for C$_{14}$H$_{20}$O$_3$: C, 71.19; H, 8.52; mol. wt. 236. Found: C, 71.16; H, 8.73; mol. wt. 228.

EXAMPLE 2

The anhydride grouping of the compound prepared as above disclosed is readily opened for the formation of esters. Accordingly, a series of esters were prepared from the adduct of maleic anhydride and the trimethylheptadiene by refluxing the adduct with the appropriate alcohol in the presence of a catalytic amount of sulfuric acid, the water formed in the reaction being removed by co-distillation and separation in a water separator. The data relating to these esters are as follows:

| Ester | B.P. | Pressure, mm. | N$_D$ | Analysis Calc. | | Found | |
|---|---|---|---|---|---|---|---|
| | | | | C | H | C | H |
| n-Butyl | 191–2 | 5 | 1.4632 | 72.09 | 10.44 | 71.91 | 10.33 |
| n-Hexyl | 192–5 | 1–2 | 1.4638 | 73.89 | 10.97 | 73.82 | 11.06 |
| n-Octyl | 220–223 | 1.5–2.5 | 1.4657 | 75.26 | 11.37 | 75.18 | 11.37 |

The three esters above indicated are representative of esters which may be formed, all three of which are useful as plasticizers for various plastics, particularly cellulose acetate and cellulose acetate butyrate. An appropriate ester can be prepared from any alcohol.

Hydrolysis of the compound with aqueous KOH yielded the dipotassium salt of the dicarboxylic acid. Upon treatment of the salt solution with aqueous sulfuric acid, the free acid was obtained.

EXAMPLE 3

Intermediate 304 g. (2 moles) dimethyl benzal and 8 ml. BF$_3$-ether complex which was added dropwise (over one hour) to 112 g. (1 mole) of diisobutylene at 27° C. resulting in a slight initial rise in temperature.

The solution was kept at room temperature for 6 hours and the catalyst was removed by addition of diethanolamine.

The product was distilled at reduced pressure and the fraction (40 g.) distilling at 85–88° C./25 mm. analyzed for carbon and hydrogen. Calcd. for C, 82.70; H, 10.41. Found: C, 81.28; H, 10.22. Redistilled and resubmitted: Found: C, 82.64; H, 10.48.

*Product*

A mixture was then prepared consisting of
31.5 g. (0.135 mole) of dimethyl benzal-diisobutylene adduct (as previously prepared)
0.3 g. p-toluenesulfonic acid and
13.2 g. (0.135 mole) maleic anhydride was heated with stirring under a takeoff reflux condenser.

The following results were obtained:

| Time | Pot Temp., degrees | Dist. Temp., degrees | Comments |
|---|---|---|---|
| 10:20 | 28 | | Started. |
| 10:28 | 75 | | Solid dissolved, orange sol. |
| 10:37 | 152 | 37 | |
| 10:40 | 190 | 80–100 | Violent boiling; turned heat down. |
| 10:43 | 175 | 87 | Boiling. |
| 11:00 | 170 | 73 | Slight boiling. |
| 12:00 | 170 | 72 | |
| 12:50 | 188 | 76 | |
| 2:40 | 178 | 54 | Heating ended. |

About 3 cc. distillate was obtained.

The reaction solution, on cooling, was a very viscous syrup. It was heated and stirred under reflux with 100 ml. 10% $H_2SO_4$ for one hour. On cooling, the aqueous layer was decanted. The thick syrup was dissolved in 120 cc. 12% NaOH. The solution was washed with ether, then acidified with 10% $H_2SO_4$. A syrup appeared on top of the aqueous layer. The mixture was extracted with 200 cc. ether. The ether was washed with two 30 cc. portions of $H_2O$, dried with $CaSO_4$, and the ether was removed. The product was recovered by distillation at 2 to 3 mm. The material was so viscous that the distillate was obtained extremely slowly.

EXAMPLE 4

This material from Example 3 was similarly esterified. The material was refluxed with 1 g. conc. $H_2SO_4$ and 70 g. (0.7 mole) butanol under a reflux condenser fitted with a take-off and graduated cylinder, for 6 hours. About 1 cc. $H_2O$ was obtained in the takeoff.

After the reaction solution was made neutral with anhydrous $Na_2CO_3$, it was distilled. Most of the butanol was distilled out at atmospheric pressure. The following results were obtained on low pressure distillation:

| Pot Temp. | Dist. Temp. | Pressure, mm. | Amount, g. | $N_{25}^D$ | Comments |
|---|---|---|---|---|---|
| 50–220 | 30 | 5 | 20 | | Butanol. |
| 220–256 | 205–212 | 1–2 | | | Product. |
| 256–259 | 212–210 | 1–2 | 23 | 1.5029 | Heart cut for anal. |
| 259–320 | 210–220 | 1–2 | | | |

Calcd. for $C_{27}H_{40}O_4$: C, 75.67; H, 9.41. Found: C, 75.63; H, 9.31
Yield=23 g. or 40% of theoretical In place of the olefins indicated above, one may use triisobutylene, tripropylene or tetrapropylene when one desires to obtain a product of type V wherein one of the $R^5$ groups is a long branched chain. The olefins that may be used include the dealkanolation products of U.S. Patent No. 2,476,525.

In place of using maleic anhydride, one may use the esters, nitrile, etc., such as dimethyl maleate to obtain the desired ester or nitrile directly.

Thus the process of the invention produces a new and useful class of compounds by a modified Diels-Alder reaction. The alkyl esters are useful as cellulose acetate and polyvinyl chloride plasticizers.

While there are above disclosed but a limited number of embodiments of the process and product of the present invention, it is possible to produce still other embodiments without departing from the inventive concept herein disclosed, and it is therefore desired that only such limitations be imposed on the appended claims as are stated therein or required by the prior art.

The invention claimed is:

1. The method of making 4-cyclohexene-1,2-dicarboxylic acid anhydrides of the formula

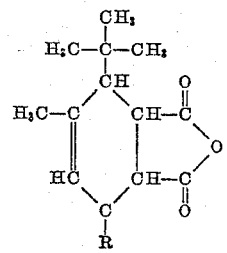

wherein R represents a member of the group consisting of methyl and phenyl; which comprises heating, in the presence of p-toluene sulfonic acid, equimolar proportions of maleic anhydride and a 4 alkoxy alkene of the formula

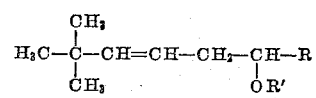

wherein R represents a member of the group consisting of methyl and phenyl and R' represents alkyl.

2. The method of making the 4 cyclohexene-1,2-dicarboxylic acid anhydride of the formula

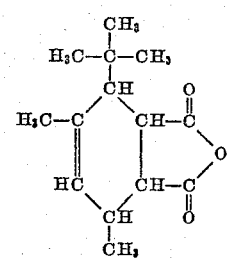

which comprises heating, in the presence of p-toluene sulfonic acid, equimolar proportions of maleic anhydride and 2,2,4-trimethyl-6-methoxy heptene-3.

3. The method of making the 4 cyclohexene-1,2-dicarboxylic acid anhydride of the formula

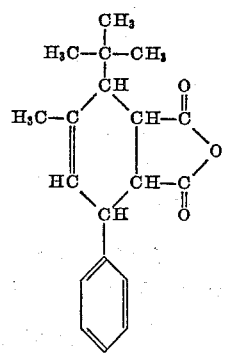

which comprises heating in the presence of p-toluene sulfonic acid equimolar proportions of maleic anhydride and 1-phenyl-1-methoxy-3,5,5-trimethyl hexene-3.

References Cited in the file of this patent

UNITED STATES PATENTS

| | | |
|---|---|---|
| 2,403,038 | Aelony | July 2, 1946 |
| 2,601,075 | Wicklatz et al. | June 17, 1952 |
| 2,739,995 | Copenhaver | Mar. 27, 1956 |
| 2,809,975 | Bezard et al. | Oct. 15, 1957 |

OTHER REFERENCES

Norton: Chemical Reviews, vol. 31, pages 361, 369, 372, 375 (1942).